United States Patent [19]
Friedrich et al.

[11] Patent Number: 4,864,890
[45] Date of Patent: Sep. 12, 1989

[54] AXLE DRIVE DIFFERENTIAL FOR MOTOR VEHICLES

[75] Inventors: Karl Friedrich, Leibnitz; Othmar Zwanzigleitner, Weiz, both of Austria

[73] Assignee: Chrysler Motors Corporation, Highland Park, Mich.

[21] Appl. No.: 266,415

[22] Filed: Nov. 2, 1988

[30] Foreign Application Priority Data

Dec. 15, 1987 [AT] Austria ................................ 3298/87

[51] Int. Cl.$^4$ .............................................. F16H 1/38
[52] U.S. Cl. ........................................ 74/713; 74/710
[58] Field of Search .................. 74/713, 710, 424, 423

[56] References Cited

U.S. PATENT DOCUMENTS

| | | | |
|---|---|---|---|
| 3,006,700 | 10/1961 | Hoffmann | 74/713 X |
| 3,118,515 | 1/1964 | Kraus et al. | 74/713 X |
| 3,202,466 | 8/1965 | Kaptur | 74/713 X |
| 4,004,472 | 1/1977 | Millward et al. | 74/713 |
| 4,630,506 | 12/1986 | Allmandinger et al. | 74/713 |
| 4,644,823 | 2/1987 | Mueller | 74/713 X |
| 4,679,463 | 7/1987 | Ozaki et al. | 74/713 X |
| 4,722,244 | 2/1988 | Tsuchiya et al. | 74/713 |

FOREIGN PATENT DOCUMENTS 3704654 9/1987 Fed. Rep. of Germany .

*Primary Examiner*—Leslie A. Braun
*Assistant Examiner*—William Gehris
*Attorney, Agent, or Firm*—Edward P. Barthel

[57] ABSTRACT

An axle drive bevel gear differential arrangement for a motor vehicle is disclosed having a two part differential case including a main part and an end closure part. A ring gear is coaxially mounted on the part and has a hidden end face which faces the differential case parts and has an outside crown point diameter only slightly larger than the outside diameter of the differential case. A plurality of threaded machine bolts extend through aligned bores in said case parts for threaded reception in blind bores in said ring gear hidden end face so as to secure the two case parts and the ring gear together in a compact minimal diameter arrangement.

1 Claim, 2 Drawing Sheets

AXLE DRIVE DIFFERENTIAL FOR MOTOR VEHICLES

BACKGROUND OF THE INVENTION

This invention relates to axle drives for motor vehicles and, more particularly, to an axle drive differential gear case arrangement for a gearbox disposed transverse to the longitudinal axis of the motor vehicle.

A conventional axle drive for a motor vehicle is disclosed and described in U.S. Pat. No. 4,630,506 to Allmandinger et al. Such prior art axle drives usually comprise a bevel gear differential and a drive pinion gear having a longitudinally extending axis with the drive pinion gear meshing with the differential ring gear. The ring gear is secured to the differential case with the ring gear rim facing away from the differential pinions. In the conventional manner, exemplified in the Allmandinger patent, the ring gear is connected by screws to a radially outwardly directed flange of the bevel gear differential case so that the ring gear and particularly its gear rim is relatively large in diameter. Such known designs restrict the ground clearance of the vehicle adjacent to the differential and increases the distance from the axle drive to the floor of the motor vehicle. Also, it is difficult to install the differential bevel pinions in the differential case because the bevel pinions must be threaded into the case through openings.

Further, in prior art arrangements, such as shown in Published German Patent Application No. 37 04 654, it is difficult to install the differential bevel pinions in the differential case. In the German Application the surface for centering the ring gear on the differential case is somewhat smaller in diameter but the gear rim of the ring gear is radially spaced a substantial distance from the flight circle of the differential bevel pinions. In addition there is the additional disadvantage in that the shaft of the drive pinion extends beyond one output shaft of the differential so that the pinion drive shaft and the output shaft must be spaced a substantial distance apart whereby the drive pinion and the ring gear cannot properly mesh with each other.

SUMMARY OF THE INVENTION

It is an object of the present invention to provide an improved axle drive differential arrangement as set forth above in which the diameters of the ring gear and, consequently, the outer housing of the axle drive can be minimized.

It is another object of the present invention to provide an improved axle drive differential as set forth above wherein the assembling of the differential is made simpler, the number of parts reduced, and a weight saving achieved.

These objects are accomplished in accordance with the present invention wherein the differential includes a two part case comprising a ring gear main case part and an end closure part. The differential ring gear defines an inner hidden face which faces the differential case and which ring gear has an outside crown point diameter that is only slightly larger than the outside diameter of the differential case. A ring gear is coaxially mounted on an annular shoulder portion of a case main part extension. The differential case two parts are secured together by plurality of threaded machine bolts each of which extends through associated aligned bores in the parts. Each machine bolt threaded end is threadably received in an associated blind bore in the ring gear hidden end face thereby securing together the ring gear and the two case parts in a compact minimal diameter arrangement.

BRIEF DESCRIPTION OF THE DRAWING

These and other objects and advantages of the present invention will be more apparent from the following description and the accompanying drawing in which.

DETAILED DESCRIPTION OF THE PREFERRED EMBODIMENT

Figure 1:
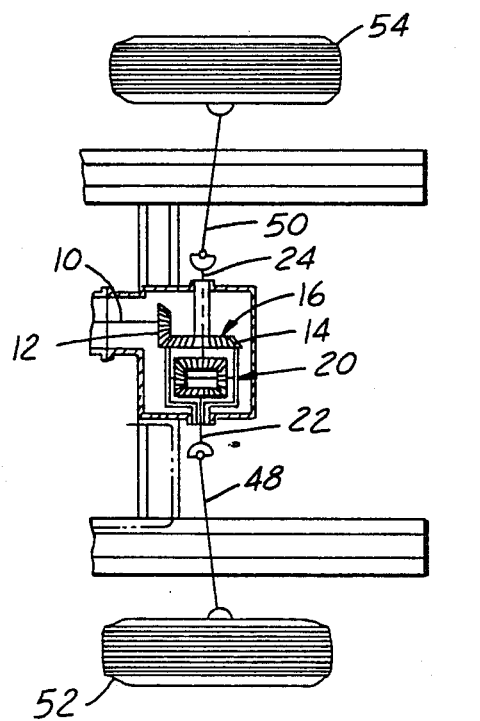
FIG. 1 of the drawings diametrically discloses the rear axle portion of a four wheel drive system for a front wheel drive vehicle incorporating the axle drive differential arrangement of the present invention.

Turning now to the drawings and more particularly to FIG. 1, an illustrative embodiment of the invention is shown in the diagrammatic view of a motor vehicle rear axle assembly. A vehicle engine (not shown) drives via a longitudinally extending propeller drive shaft 10 having a drive pinion gear 12 fixed on its aft end. The drive pinion gear 12 meshes with a bevel gear rim 14 of a ring gear generally indicated at 16 in FIG. 2. A rear axle differential is shown generally at 20 in FIGS. 1 and 2.

Figure 2:
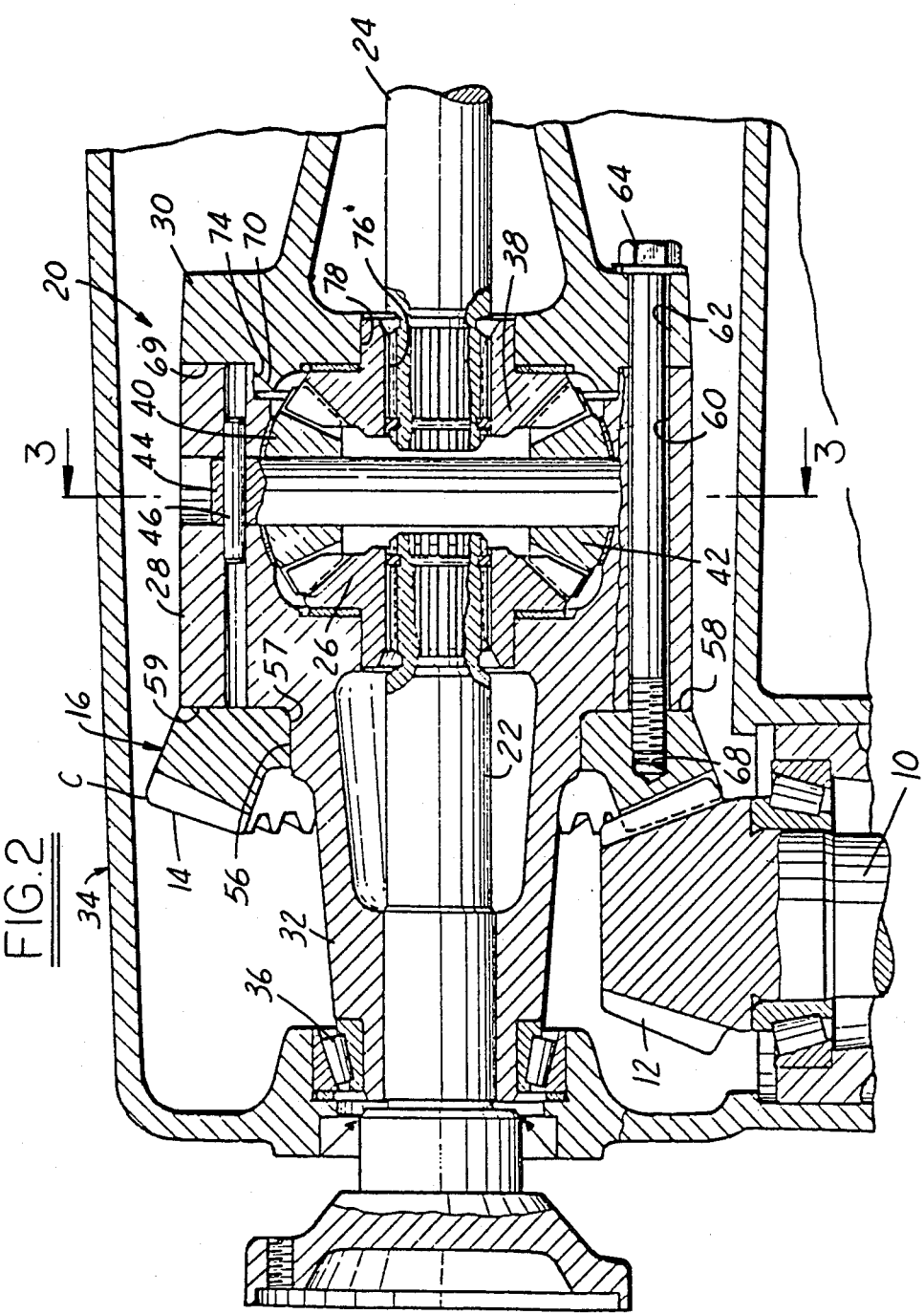
FIG. 2 is a horizontal fragmentary sectional view, with parts broken away, showing the bevel gear differential of FIG. 1.

As seen in FIG. 2 extending outwardly from the rear axle differential 20 are a pair of side gear axle shafts 22 and 24. The inboard end of the first side gear axle shaft 22 is splined in an axial bore of a first differential bevel side gear 26. The side gear 26 is located in a differential case assembly comprising a differential case main part 28 and an end closure part 30. The differential case main part 28 has an integral axial extension 32 rotatably journalled at its outboard end in outer axle housing 34 by bearing 36. A second differential bevel side gear 38 is supported in case end closure part 30 and has its axial bore splined to the inboard end of axle shaft 24.

The bevel gear differential side gears 26 and 38 mesh with a pair of bevel pinion gears 40 and 42 mounted on pinion spindle 44 supported in the ring gear main part 28 of the case. A cross pin 46 is provided to locate the pinion spindle 44 in the case main part 28. As seen in FIG. 1 the axle shafts 22 and 24 are universally connected to axle half shafts 48 and 50 respectively, for driving respective rear road wheels 52 and 54.

It will be noted in FIG. 2 that the differential case main part axial extension 32 is formed with an annular stepped shoulder 56 for concentrically receiving and centering the ring gear 16 by means of its axial bore 57. The ring gear 16 is formed with an inner or hidden end face 58 positioned to axially abut in a flush manner end face 59 of the differential case main part 28. The "crown point" of the ring gear rim 14 defines a maximum outside ring gear diameter "C" that is approximately as large as the outside diameter of the differential case main part 28. As a result, the diameters of the ring gear rim crown point "C" and of the outer housing 34 are minimized.

Figure 3:
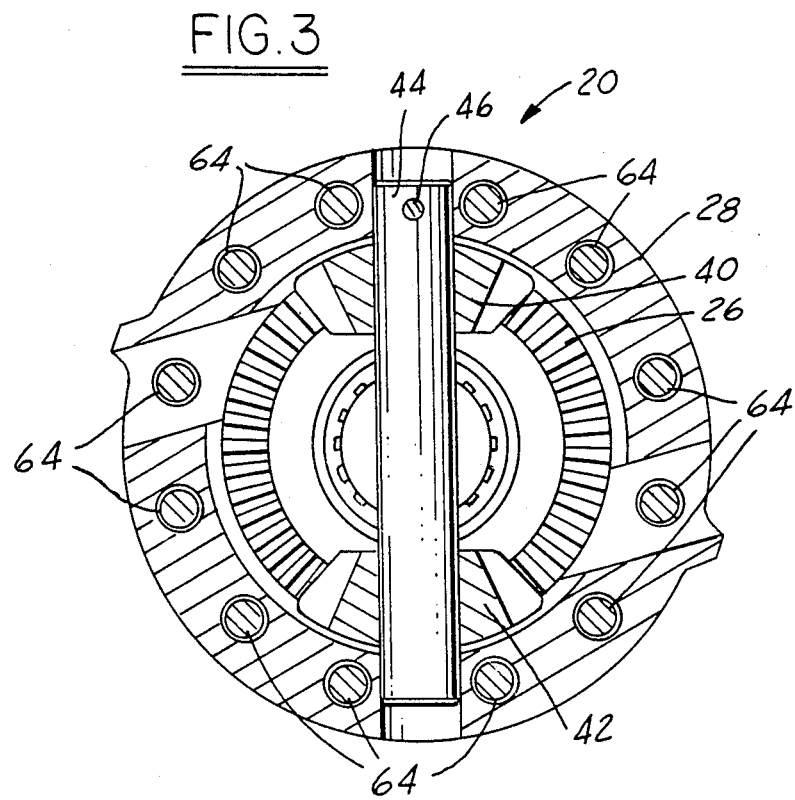
FIG. 3 is a partial vertical sectional view taken on the line 3—3 of FIG. 2.

With reference to FIGS. 2 and 3 it will be seen that the two parts 28 and 30 of the differential case have a plurality of axially aligned through-bores 60 and 62 respectively, and are adapted to be secured together by a plurality of machine bolts 64. In the disclosed form of the invention twelve machine bolts 64 are provided. It will be noted that the hidden end face 58 of the ring gear 16 has a plurality of internally threaded blind bores 68 for threadably receiving the threaded ends of associated machine bolts 64 so as to fixedly secure the ring gear face 58 to the differential case main part opposed face 59. This arrangement thus eliminates the need for separate fastening means to secure the ring gear 16 to the differential main case part 28. It will be noted in FIG. 2 that the case end closure part 30 inner face 69 is formed with a annular raised disc portion 70 defining a cylindrical collar adapted to be concentrically received in the open end of a main case part counterbore 74. By virtue of this arrangement the principal axis of side gear internally splined bore 76 coincides with the principal axis of axle 24 and end closure opening 78 upon assembly of the differential.

While a specific embodiment of the invention has been shown and described in detail to illustrate the application of the principles of the invention, it will be understood that the invention may be embodied otherwise without departing form such principles.

What is claimed is:

1. In a rear axle drive for a motor vehicle, comprising:
   a rotatably mounted bevel gear differential case;
   a pair of first and second beveled side gears disposed in said case, each said first and second side gear having an internally splined opening receiving externally splined inboard ends of first and second, respectively, axle shafts therein aligned on a first axis;
   a pinion shaft mounted in said case and aligned on a second axis intersecting said first axis at an angle of ninety degrees;
   a pair of beveled pinion gears rotatably journalled on said pinion shaft and meshing with said side gears;
   a ring gear concentrically surrounding said first axle shaft and coaxially secured to the outside of said case, and said ring gear having a bevel gear rim facing away from said pair of beveled pinion gears; and
   a propeller driveshaft having a drive pinion gear mounted on the end thereof meshing with said ring bevel gear rim, said drive shaft principal axis intersecting said first axis intermediate said first axle shaft splined inboard end and the outboard end of said first axle shaft, the improvement wherein;
   said ring gear having a hidden end face which faces said differential case and an outside diameter that is only slightly larger than the outside diameter of said differential case;
   said differential case consisting of a main part having one end closed by an integral axial extension concentrically surrounding said first axial shaft, said case having one open end closed by an end closure part concentrically surrounding said second axle shaft;
   a plurality of identical securing machine bolts of predetermined axial length with each said bolt axial length substantially equal to but greater than the axial length of said pinion shaft, each said bolt having a threaded end and a head end, each said bolt having its principal axis aligned on an imaginary circle concentric with said first axis;
   each said bolt extending through aligned bores in said case main part and said end closure part with each said bolt head end engaging said closure part and each said bolt threaded end being threadably received in an aligned blind bore in said ring gear hidden end face;
   whereby a transverse plane of symmetry common to the said pinion shaft second axis intersects said first axis at a right angle such that said plane intersects each said bolt substantially at its midpoint, wherein the bolts securing said case main part and said end closure part to each other and securing said ring gear to said case main part;
   said case main part formed with an axial extension having an annular stepped shoulder concentrically receiving thereon an internal axial bore of said ring gear; and
   said end closure part inner face formed with an annular rib having a cylindrical collar concentrically received in a counterbore formed in one open end of said case main part.

* * * * *